(12) United States Patent
Risch et al.

(10) Patent No.: US 12,535,359 B1
(45) Date of Patent: Jan. 27, 2026

(54) NON-CONTACT BROAD-RANGE TEMPERATURE MEASUREMENT SYSTEM

(71) Applicant: United States of America as Represented by the Administrator of NASA, Washington, DC (US)

(72) Inventors: Timothy Risch, Palmdale, CA (US); Christopher Kostyk, Palmdale, CA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 789 days.

(21) Appl. No.: 17/957,674

(22) Filed: Sep. 30, 2022

(51) Int. Cl.
*G01J 5/0821* (2022.01)
(52) U.S. Cl.
CPC .................................. *G01J 5/0821* (2013.01)
(58) Field of Classification Search
None
See application file for complete search history.

(56) References Cited

FOREIGN PATENT DOCUMENTS

| JP | H0823308 B2 | * | 3/1996 | ............ F02F 11/002 |
| RU | 2422633 C1 | * | 6/2011 | ............... G01V 3/26 |

\* cited by examiner

*Primary Examiner* — Andrew Smyth
(74) *Attorney, Agent, or Firm* — Jennifer L. Riley; Trenton J. Roche

(57) ABSTRACT

A temperature measurement system includes a multimode fiber optic cable having a first end and a second end. A fixture positions the first end in non-contact proximity to a refractory-material object configured to experience temperatures in a temperature range from ambient atmospheric temperature to approximately 3300° K. The radiant energy emanating from the object is collected at the fiber optic cable's first end and is transmitted to its second end. An optical detector, coupled to the second end of the fiber optic cable, converts the radiant energy to a first electrical signal having an amplitude spanning multiple orders of magnitude. A logarithmic converter coupled to the optical detector compresses the first electrical signal to generate a second electrical signal having an amplitude spanning a single order of magnitude.

18 Claims, 2 Drawing Sheets

NON-CONTACT BROAD-RANGE TEMPERATURE MEASUREMENT SYSTEM

ORIGIN OF THE INVENTION

Figure 1:
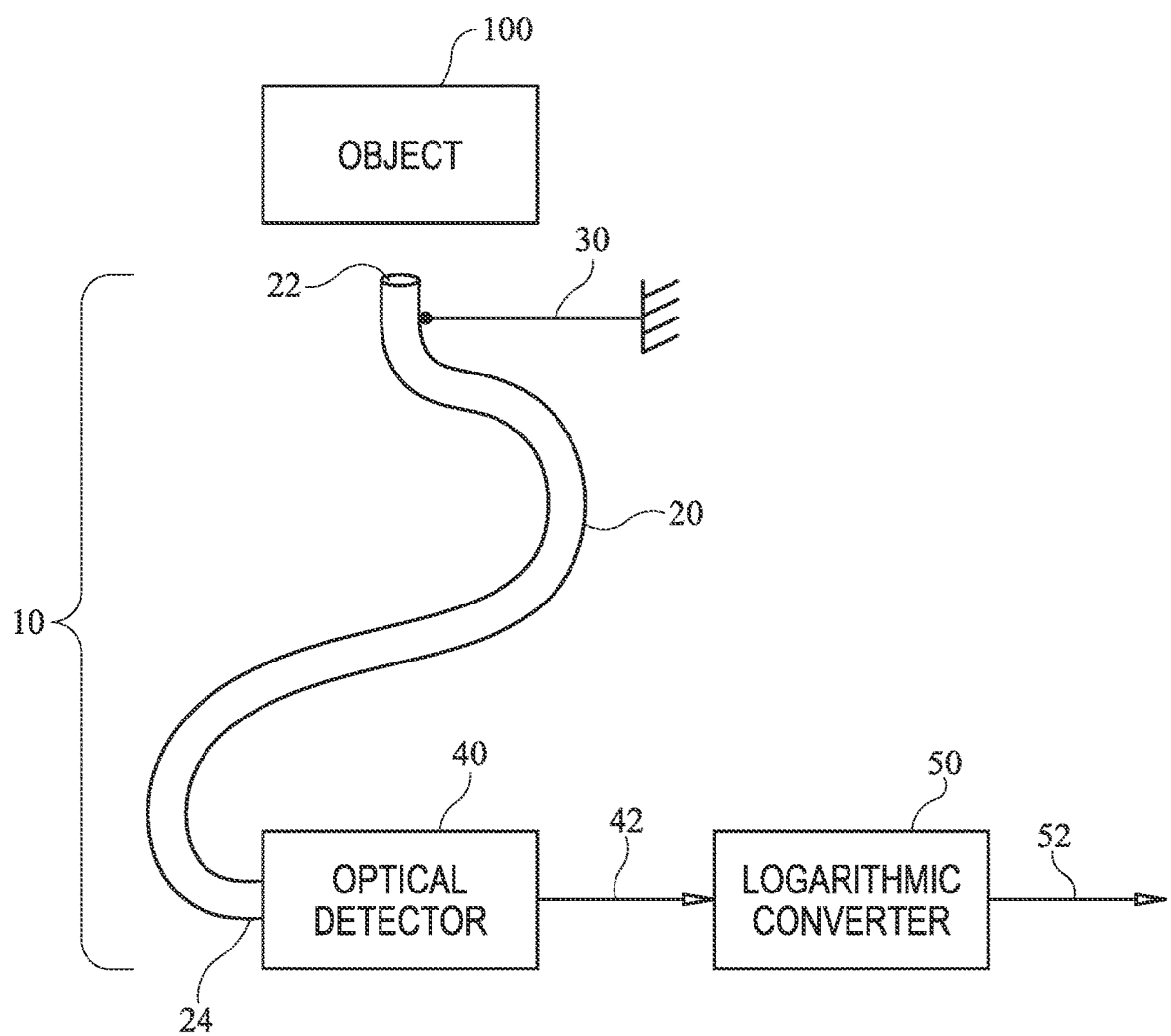

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to temperature measurement systems. More specifically, the invention is a non-contact temperature measurement system for operation over a broad range of temperatures such as the range of temperatures encountered at the heat shield of an air or space vehicle traveling through the atmosphere at high speeds as is the case during reentry operations.

2. Description of the Related Art

During high-speed flight operations and reentry operations, air and space vehicles must endure high temperatures as well as significant static and dynamic loads. In terms of monitoring such high temperatures, temperature sensors such as thermocouples have traditionally been bonded to surface regions of a vehicle structure. Maintaining bond integrity can be difficult or impossible when a vehicle is experiencing extreme temperatures or high dynamic loads. However, it is critical to measure temperature data during such times as the data can be a crucial piece of information used in the analysis of vehicle behavior.

In addition to the above-described thermocouple bonding problem, wiring harnesses used to couple thermocouples to their electronics present a variety of assembly difficulties in many modern-day spacecraft. Briefly, a spacecraft's outer shell to include its heat shield (also known as an aeroshell) can be fabricated as a hollow structure into which the spacecraft's primary structure (e.g., structural frame, electronic systems, heat insulating structure, etc.) is inserted. Since thermocouples' wiring harnesses must be run along the inside of the aeroshell so that they do not act as a heat sink, management of thermocouples' wiring harnesses during primary structure insertion can be challenging. Further, increased costs and scheduling delays ensue if the wiring harnesses are damaged during vehicle assembly. Operationally, wiring harnesses can be subject to electromagnetic interference (EMI) from a variety of sources.

SUMMARY OF THE INVENTION

Accordingly, it is an object of the present invention to provide a non-contact high-temperature measurement system that eliminates thermocouple bonding and operational issues.

Another object of the present invention is to provide a non-contact temperature measurement system compatible with modern-day spacecraft assemblies and assembling processes.

Other objects and advantages of the present invention will become more obvious hereinafter in the specification and drawings.

In accordance with the present invention, a temperature measurement system includes a multimode fiber optic cable having a first end and a second end. A fixture, coupled to the first end of the fiber optic cable, positions the first end in non-contact proximity to a refractory-material object configured to experience temperatures in a temperature range from ambient atmospheric temperature to approximately 3300° K. The radiant energy emanating from the object is collected at the fiber optic cable's first end and is transmitted to its second end. An optical detector, coupled to the second end of the fiber optic cable, converts the radiant energy to a first electrical signal indicative thereof. The amplitude of the first electrical signal spans multiple orders of magnitude. A logarithmic converter coupled to the optical detector compresses the first electrical signal to generate a second electrical signal whose amplitude spans a single order of magnitude.

BRIEF DESCRIPTION OF THE DRAWING(S)

Figure 2:
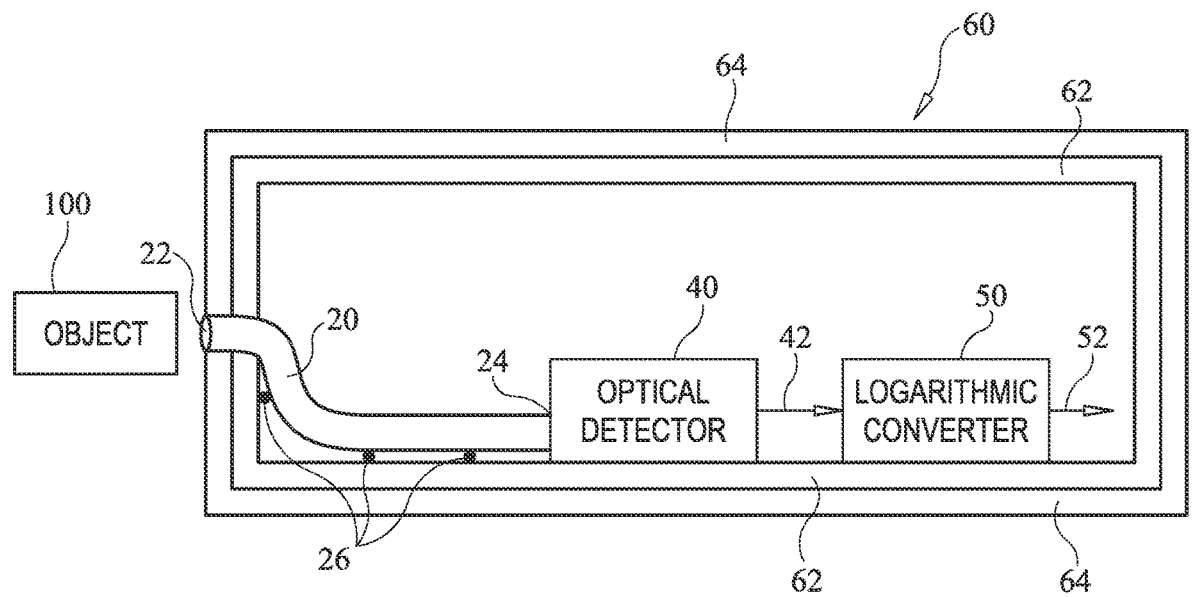
Figure 3:
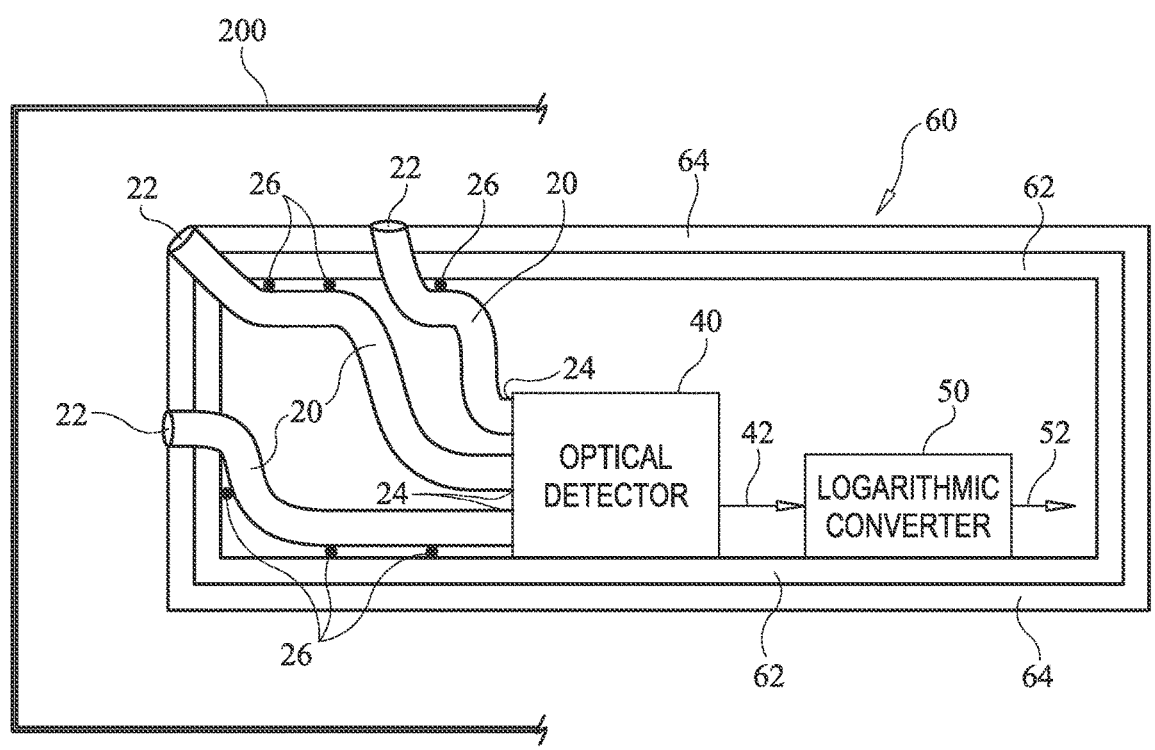

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic view of a non-contact, broad-range temperature measurement system in accordance with an embodiment of the present invention;

FIG. 2 is a schematic view of a non-contact, broad-range temperature measurement system that includes a thermally insulated body in accordance with another embodiment of the present invention; and FIG. 3 is a schematic view of a non-contact, broad-range temperature measurement system with its thermally insulated body shown prior to encasement thereof within a portion of an aeroshell in accordance with another embodiment of the present invention.

DESCRIPTION OF THE PREFERRED EMBODIMENT(S)

Referring now to the drawings and more particularly to FIG. 1, a non-contact, broad-range temperature measurement system in accordance with an embodiment of the present invention is illustrated schematically and is referenced generally by numeral 10. Temperature measurement system 10 (hereinafter "system 10") provides measurements of temperature in terms of radiant heat emanating from an object 100 experiencing a wide range of temperature variation. For example, in some embodiments of the present invention as will be explained further below, the range of temperatures can extend from a low of ambient atmospheric temperatures to a high of approximately 3300° K. In such applications, object 100 typically includes an outer body or shell that is at least partially constructed using refractory materials that maintain their strength and form in high-temperature environments. A variety of such refractory materials are well-known in the art, and the choice of such refractory materials is not a limitation of the present invention.

System 10 includes a fiber optic cable 20, a fixture 30, an optical detector 40, and a logarithmic converter 50. In general, fiber optic cable 20 is a multimode fiber optic cable that can detect radiant energy emanating from object 100 and transmit the radiant energy along the length of the cable. The core size of fiber optic cable 20 determines how much radiant energy can be transmitted by the cable. In the present invention, the core size of fiber optic cable 20 is dependent on the expected temperature range to be measured, the optical properties of the surface of object 100 near the detecting end of fiber optic cable 20, and the properties/features of optical detector 40. Regardless of its core size, fiber optic cable 20 has one end 22 that will detect and receive radiant energy emanating from object 100, and a second end 24 that will provide the radiant energy transmitted along cable 20 to optical detector 40.

Fixture 30 supports and holds end 22 in its desired non-contact measurement position relative to object 100. In some embodiments, fixture 30 is coupled to object 100. In some high-temperature applications, fixture 30 can also serve as a heat sink designed to draw or wick heat away from end 22 to prevent damage thereto during long-term and/or repeated exposures to high temperatures. Heat sink features of fixture 30 can be realized by a variety of structures (e.g., a tubular holder, a heat strap, etc.) without departing from the scope of the present invention.

Optical detector 40 converts the radiant energy received from second end 24 into a DC electrical signal 42 indicative of the radiant energy. When the radiant energy is associated with a broad range of temperatures (e.g., from ambient atmospheric temperature up to approximately 3300° K as described above), the amplitude of the generated electrical signal 42 will span over multiple orders of magnitude.

The electrical signal 42 generated by optical detector 40 is output to logarithmic converter 50. The multiple-orders-of-magnitude electrical signal 42 is compressed by converter 50 and is output therefrom as output signal 52 having an amplitude that spans only a single order of magnitude. For example, converter 50 can be configured such that the amplitude range of output signal 52 is approximately 0.5 volts DC to approximately 4.5 volts DC to facilitate subsequent processing thereof by conventional electronics. However, it is to be understood that the compressed amplitude range of output signal 52 can be adapted to a variety of single-order-of-magnitude amplitude ranges in order to satisfy the needs of subsequent processing electronics without departing from the scope of the present invention.

In some embodiments of the present invention, the temperature measurement system can include a thermally insulated body 60 as is illustrated schematically in FIG. 2. Thermally insulated body 60 includes a structural or rigid frame 62 and one or more outer layers of thermal insulation materials 64 coupled to frame 62. Insulation material 64 can include flexible and/or rigid insulation depending on the application without departing from the scope of the present invention. In general, insulation material 64 supports end 22 of fiber optic cable 20 in a way that allows end 22 to be in non-contact proximity to object 100 such that end 22 is exposed to radiant energy emanating from object 100 as described above. Depending on the construction of thermally insulated body 60, the fixating support function for end 22 (e.g., as described above for fixture 30) can be provided solely by insulation material 64 or by a combination of frame 62 and insulation material 64. In some embodiments of the present invention, end 22 can be supported in a separate fixture (not shown) disposed within insulation material 64 and/or coupled to frame 62.

For some embodiments of the present invention, it may be desirable to house all of fiber optic cable 20, optical detector 40, and logarithmic converter 50 within thermally insulated body 60 as shown. Further, in some embodiments of the present invention, optical detector 40 and logarithmic converter 50 can be mounted to frame 62. In some embodiments, fiber optical cable 20 is "dressed" within body 60 and is fixed relative to frame 62 at one or more locations within body 60 using cable couplers 26, the design of which is not a limitation of the present invention.

The present invention is readily adapted for incorporation into modern spacecraft, rockets, aircraft, and other applications involving high temperatures that have an outer "shell" (e.g., an aeroshell for a modern spacecraft) specifically constructed to withstand a very broad range of temperatures to which it will be subject during the operation thereof. By way of example, FIG. 3 illustrates a portion of a vehicle's outer aeroshell 200 that is a hollow structure configured to receive therein (e.g., in a nested relationship) thermally insulated body 60. The portion(s) of aeroshell 200 receiving body 60 can be at one or more of the forward, middle, and/or aft portions of a vehicle without departing from the scope of the present invention. The shapes and sizes of body 60 and aeroshell 200 are not limitations of the present invention. Regardless of its position in a vehicle body, body 60 is shaped for insertion into and encasement by aeroshell 200 during the fabrication of the ultimate vehicle in accordance with well-known techniques.

Aeroshell 200, or at least its outer surface, will incorporate refractory materials capable of withstanding expected operational temperatures (e.g., ranging from ambient atmospheric temperature up to approximately 3300° K) using materials and fabrication processes that are not limitations of the present invention. Frame 62 and insulation material 64 are shaped as needed to fit within aeroshell 200. In this type of embodiment, frame 62 will typically include internal struts, beams, etc., that have been omitted from FIG. 3 for clarity of illustration.

For a typical spacecraft implementation of the present invention, multiple fiber optic cables 20 will be provided in thermally insulated body 60 with each end 22 thereof being positioned strategically to detect radiant energy (i.e., indicative of temperature) at a relevant portion of aeroshell 200 after body 60 is encased within aeroshell 200. The number of fiber optic cables used is not a limitation of the present invention. All fiber optic cables 20 can be "dressed" within frame 62 using cable couplers 26. Optical detector 40 and logarithmic converter 50 are disposed within body 60 and can be mounted to frame 62.

The advantages of the present invention are numerous. The temperature measurement system can be adapted for a variety of high-temperature applications in aerospace, industry, and the military. The system provides a simple and robust approach to non-contact temperature measurement when expected temperatures will span over a broad range. In terms of spacecraft applications relying on aeroshells for high-temperature protection, the present invention provides designers with a new approach for the inclusion of temperature sensors without risking damage thereto during fabrication and use of the spacecraft.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A temperature measurement system, comprising:
 a multimode fiber optic cable having a first end and a second end;

a fixture coupled to said first end of said fiber optic cable, said fixture adapted to position said first end in non-contact proximity to a refractory-material object configured to experience temperatures in a temperature range from ambient atmospheric temperature to approximately 3300° K, wherein radiant energy emanating from the object experiencing the temperatures in the temperature range is collected at said first end and is transmitted to said second end;

an optical detector coupled to said second end of said fiber optic cable for converting the radiant energy to a first electrical signal indicative thereof, said first electrical signal having an amplitude spanning multiple orders of magnitude; and a logarithmic converter coupled to said optical detector for compressing said first electrical signal to generate a second electrical signal having an amplitude spanning a single order of magnitude.

2. A temperature measurement system as in claim 1, wherein said fixture comprises a thermal insulation material.

3. A temperature measurement system as in claim 1, wherein said fixture comprises a thermally insulated body having an outer surface adapted to fit within a vehicle's shell.

4. A temperature measurement system as in claim 1, wherein said optical detector and said logarithmic converter are coupled to said fixture.

5. A temperature measurement system as in claim 1, wherein said fixture comprises:
a rigid frame; and
thermal insulation encasing said rigid frame, wherein said first end of said fiber optic cable is supported in said thermal insulation.

6. A temperature measurement system as in claim 5, where said fiber optic cable is coupled to said rigid frame between said first end thereof and said second end thereof.

7. A temperature measurement system as in claim 5, wherein said optical detector and said logarithmic converter are mounted on said rigid frame.

8. A temperature measurement system as in claim 1, wherein said fixture wicks heat away from said first end of said fiber optic cable.

9. A temperature measurement system, comprising:
a multimode fiber optic cable having a first end and a second end;
a thermally insulated body having an outer surface, said thermally insulated body adapted to fully fit within a vehicle's shell, said thermally insulated body supporting said first end of said fiber optic cable at a position adapted to be in non-contact proximity to the vehicle's shell when said thermally insulated body is fully fit therein, wherein radiant energy emanating from the vehicle's shell is collected at said first end and is transmitted to said second end;
an optical detector coupled to said second end of said fiber optic cable for converting the radiant energy to a first electrical signal indicative thereof, said first electrical signal having an amplitude spanning multiple orders of magnitude; and
a logarithmic converter coupled to said optical detector for compressing said first electrical signal to generate a second electrical signal having an amplitude spanning a single order of magnitude.

10. A temperature measurement system as in claim 9, wherein said optical detector and said logarithmic converter are disposed within said thermally insulated body.

11. A temperature measurement system as in claim 9, wherein said thermally insulated body comprises:
a rigid frame; and
thermal insulation encasing said rigid frame, wherein said first end of said fiber optic cable is supported in said thermal insulation.

12. A temperature measurement system as in claim 11, wherein said fiber optic cable is coupled to said rigid frame between said first end thereof and said second end thereof.

13. A temperature measurement system as in claim 11, wherein said optical detector and said logarithmic converter are mounted on said rigid frame.

14. A temperature measurement system, comprising:
a plurality of multimode fiber optic cables, each fiber optic cable from said fiber optic cables having a first end and a second end;
a thermally insulated body having an outer surface, said thermally insulated body adapted to be encased within a spacecraft's aeroshell configured to experience temperatures in a temperature range from ambient atmospheric temperature to approximately 3300° K, said thermally insulated body supporting said first end of said each fiber optic cable at a position adapted to be in non-contact proximity to the aeroshell when said thermally insulated body is encased therein, wherein radiant energy flowing from the aeroshell to said thermally insulated body is collected at said first end of said each fiber optic cable and is transmitted to said second end associated therewith;
an optical detector coupled to said second end of said each fiber optic cable for converting the radiant energy to a first electrical signal indicative thereof, said first electrical signal having an amplitude spanning multiple orders of magnitude; and
a logarithmic converter coupled to said optical detector for compressing each said first electrical signal to generate a second electrical signal having an amplitude spanning a single order of magnitude.

15. A temperature measurement system as in claim 14, wherein said optical detector and said logarithmic converter are disposed within said thermally insulated body.

16. A temperature measurement system as in claim 14, wherein said thermally insulated body comprises:
a rigid frame; and
thermal insulation encasing said rigid frame, wherein said first end of said each fiber optic cable is supported in said thermal insulation.

17. A temperature measurement system as in claim 16, wherein said each fiber optic cable is coupled to said rigid frame between said first end thereof and said second end thereof.

18. A temperature measurement system as in claim 16, wherein said optical detector and said logarithmic converter are mounted on said rigid frame.

* * * * *